United States Patent [19]

Kettner et al.

[11] Patent Number: 4,857,297

[45] Date of Patent: * Aug. 15, 1989

[54] PROCESS FOR THE REDUCTION OF THE SULFUR CONTENT IN A GASEOUS STREAM

[75] Inventors: Roland Kettner, Heist; Norbert Liermann, Bergen; Torsten Lubcke, Hambuhren, all of Fed. Rep. of Germany

[73] Assignee: Mobil Oil Corporation, New York, N.Y.

[*] Notice: The portion of the term of this patent subsequent to Nov. 12, 2002 has been disclaimed.

[21] Appl. No.: 36,413

[22] Filed: Apr. 9, 1987

Related U.S. Application Data

[63] Continuation-in-part of Ser. No. 797,103, Nov. 12, 1985, abandoned, which is a continuation of Ser. No. 435,832, Oct. 21, 1982, Pat. No. 4,552,746.

[30] Foreign Application Priority Data

Nov. 2, 1981 [DE] Fed. Rep. of Germany ....... 3143400

[51] Int. Cl.$^4$ ............................................. C01B 17/02
[52] U.S. Cl. .................. 423/576.8; 423/244; 423/567 R; 423/574 R
[58] Field of Search ........... 423/573 G, 567 R, 573 R, 423/574 R, 574 L, 244 R, 244 A, 576.8

[56] References Cited

U.S. PATENT DOCUMENTS

| 4,146,580 | 3/1979 | Beavon | 423/564 |
|---|---|---|---|
| 4,388,288 | 6/1983 | Dupin et al. | 423/416 |
| 4,399,112 | 8/1983 | Voirin | 423/564 |
| 4,479,928 | 10/1984 | Voirin | 423/567 R |
| 4,522,746 | 11/1985 | Kettner | 423/573 G |

FOREIGN PATENT DOCUMENTS

| 0078690 | 1/1982 | European Pat. Off. |   |
|---|---|---|---|
| 856974 | 8/1981 | U.S.S.R. | 423/573 |
| 25976 | of 1907 | United Kingdom | 423/573 G |
| 622324 | 3/1947 | United Kingdom . |   |
| 1437143 | 5/1976 | United Kingdom | 423/574 R |

OTHER PUBLICATIONS

Stegins et al., "Catalytic Oxidation of Hydrogen Sulfide: Influence of Pore Structure and Chemical Composition of Various Porous Substances", Industrial Eng. Chem., Prod. Res. Dev., vol. 16, No. 1, 1977, p. 35–41.
Notice of Opposition (BASF to EPO).

*Primary Examiner*—Gregory A. Heller
*Attorney, Agent, or Firm*—Alexander J. McKillop; Charles J. Speciale; Richard D. Stone

[57] ABSTRACT

$H_2S$ is directly oxidized to elemental sulfur by contacting an $H_2S$ containing gas stream having a water content less than 10% by volume with air or oxygen over a catalyst containing at least 80 wt % titanium dioxide. Most of the $H_2S$ in the gas is oxidized to elemental sulfur. The process is especially useful for recovery of additional sulfur from effluent gas from a Claus unit.

13 Claims, 2 Drawing Sheets

PROCESS FOR THE REDUCTION OF THE SULFUR CONTENT IN A GASEOUS STREAM

CROSS REFERENCE

This application is a continuation-in-part of our prior copending application U.S. Ser. No. 797,103 filed on Nov. 12, 1985, now abandoned which is a continuation of prior copending application U.S. Ser. No. 435,832 filed on Oct. 21, 1982 4,557,746. These applications are incorporated herein by reference.

Our U.S. Ser. No. 435,832 claims International Convention Priority based upon our application number P3143400.2 filed on Nov. 2, 1981 in the Federal Republic of Germany.

FIELD OF THE INVENTION

The invention relates to a process for extracting sulfur from a gas containing hydrogen sulfide.

The invention is particularly adapted for desulfurizing the exhaust gas from a Claus unit. The process also works on sulfur-containing gas streams, e.g., light, saturated hydrocarbons, hydrogen or carbon monoxide gas streams containing $H_2S$.

BACKGROUND OF THE INVENTION

In the Claus process, elemental sulfur is produced by reacting $H_2S$ and $SO_2$ in the presence of a catalyst. The Claus system uses a combustion chamber which, at 950°–1350° C., converts 50 to 70% of the sulfur contained in the feed gas into elemental sulfur. The sulfur is condensed by cooling the reaction gas to a temperature below the dew point of sulfur, after which the remaining gas is heated and further reacted over a catalyst. Normally, the gas passes through at least two such Claus catalyst stages.

The different stages of the process may be represented by the following equations:

$$H_2S + 3/2\ O_2 \rightarrow SO_2 + H_2O \qquad (I)$$

$$2\ H_2S + SO_2 \rightleftharpoons 3\ S_n + 2\ H_2O \qquad (II)$$

The overall reaction is:

$$3\ H_2S + 3\ O_2 \rightleftharpoons 3\ S_n + 3\ H_2O \qquad (III)$$

Below 500° C., the symbol n has a value of approximately 8.

The final Claus exhaust gas still contains small amounts of $H_2S$, $SO_2$, $CS_2$, carbon oxysulfide, and elemental sulfur in the form of a vapor or mist. The exhaust gas is usually subjected to post-combustion to convert everything to $SO_2$, which is then emitted into the atmosphere.

The sulfur emitted as $SO_2$ into the atmosphere with the exhaust gas may amount to 2–6% of the sulfur contained in the feed gas in the form of $H_2S$. In view of air pollution and the loss of sulfur involved, further purification is imperative.

Claus aftertreatments have been developed. These are carried out after the last Claus stage or after the post-combustion. These aftertreatments are, however, complicated and expensive or inadequate.

One aftertreatment, carried out before post-combustion, seeks to achieve by catalytic conversion as complete a reaction as possible between $H_2S$ and $SO_2$. The reaction temperature is lowered to below the condensation point of sulfur, whereby the reaction equilibrium corresponding to equation II is shifted to form sulfur. A distinction is made between dry processes using alternating reactors in which the catalyst is intermittently charged with sulfur and discharged, and processes where $H_2S$ and $SO_2$ react in a high-boiling catalyst-containing liquid to form elemental sulfur which is drawn off continuously as a liquid product.

Unfortunately, in these processes any deviation from the optimum $H_2S:SO_2$ ratio in the Claus exhaust gas results in a reduced sulfur yield. No appreciable conversion of sulfur compounds such as COS and $CS_2$ occurs. Sulfur recovery efficiency of Claus using this form of aftertreatment is limited to 98–99%. Cyclic operation, with alternating reactors, requires at least two reactors and much valves and piping.

A second aftertreatment catalytically hydrogenates $SO_2$ and S with $H_2$ and CO while COS and $CS_2$ are simultaneously hydrolyzed with $H_2O$ into $H_2S$, which can be treated conventionally.

Hydrogenation/hydrolysis does not require a stoichiometric $H_2S/SO_2$ ratio in the Claus exhaust gas. It almost completely converts COS and $CS_2$ so that sulfur yields of more than 99.8% can eventually be obtained. This process requires high expenditure for elaborate apparatus and consumes a lot of energy. Recycle of $H_2S$ reduces the Claus system capacity, while the production of waste water containing harmful constituents presents additional problems.

A third aftertreatment oxidizes all sulfur compounds into $SO_2$ which is then further processed. These processes are downstream of the post-combustion and therefore independent of the mode in which the Claus system is run. There are also dry processes, where $SO_2$ is adsorbed and returned to the Claus unit or processed to form sulfuric acid, and wet processes, where $SO_2$ is removed by absorptive scrubbing and further processed. For complete oxidation of COS and $CS_2$ into $SO_2$, the energy requirements are high and following the after-combustion, very large exhaust gas flows have to be treated.

The equilibrium conversion of the Claus reaction (equation II) may be improved by condensing out part of the water in the gas. The gas is then reheated and charged to another Claus stage to form elemental sulfur. This produces waste water which is highly corrosive due to the formation of thiosulfuric acid, polythionic acids and sulfurous acid. Processing of such waste water is expensive. Unavoidable formation of deposits of elemental sulfur also occurs during $H_2O$ condensation. Moreover, there is no conversion of COS and $CS_2$ so the maximum recovery of sulfur is about 98%. As a result of these disadvantages, this process has not been used on a commercial scale.

Where the aftertreatment involves conversion of all sulfur compounds into hydrogen sulfide, it is also known to oxidize part of said hydrogen sulfide with air into $SO_2$ or to convert part of the sulfur produced into sulfur dioxide and thereafter catalytically to convert the remaining hydrogen sulfide with sulfur dioxide at 125°–150° C. in fixed-bed reactors into sulfur. The sulfur loaded catalyst is regenerated by passing hot oxygen-free gases containing hydrogen sulfide through the catalyst. This avoids the disadvantages associated with the first type of aftertreatment, such as dependence on $H_2S/SO_2$ ratio and COS/$CS_2$ content in the Claus exhaust gas. Disadvantages of this process are the high capital cost and the higher $H_2S + SO_2$ input concentration for the low-temperature reactor caused by the admixture of a separately produced flow of $SO_2$. The maximum conversion overall efficiency obtainable with this process approaches 99%.

Direct catalytic oxidation of $H_2S$ in gas mixtures with air or oxygen into elemental sulfur is also known. These processes are not sufficiently effective in the thermodynamically advantageous temperature range or the catalysts quickly lose activity. The conversion efficiency may be poor, with low sulfur concentrations because of the unfavorable reaction kinetics at low temperatures. Some processes lack selectivity for $H_2S$ so that compounds, such as $H_2$, CO and hydrocarbons, are oxidized as well. To avoid this, the $H_2S$ oxidation may be done at temperatures below the dew point of sulfur, but then the catalyst becomes loaded with elemental sulfur and must periodically be regenerated. Many catalysts also lose activity due to adsorption of $SO_2$ or sulfation. Proposed catalysts include bauxite, aluminosilicate zeolites, active carbon, oxides or sulfides of tungsten, vanadium, chromium, iron, cobalt, nickel, copper, molybdenum, silver, and manganese on supports, as well as alkali metal sulfides and combinations of alkali metal oxides with alkaline earth metal oxides.

DE-A-2,754,595 describes a process for cleaning the effluent gases of a Claus unit and uses a catalyst containing silver or 1 to 20% titanium dioxide when treating a gas containing carbon oxysulfide and/or carbon disulfide. In general terms, this publication is directed to the hydrolysis of COS and $CS_2$ using a reducing atmosphere, page 12, lines 2-9, stating that it is preferred to have a hydrolysis step in the substantial absence of oxygen.

U.S. Pat. No. 4,414,962 describes the treatment of carbon derivatives of sulfur in the Claus process and recognizes that the best way to destroy COS and $CS_2$ is by hydrolysis. That document notes that $TiO_2$ is a good catalyst for such a reaction but emphasizes that high $TiO_2$ concentrations are to be avoided.

EP-A-136,741 is concerned with improving $TiO_2$-catalysts for use in the Claus process. Oxygen may be present, but it is stated at Page 20, lines 1-4 that oxygen causes no change to the yield.

There is a great need for a simple process which can be used downstream of conventional Claus units to clean up the Claus gas effluent. It would be especially beneficial if a process could be found which can satisfactorily upgrade Claus gas effluent after hydrogenation/hydrolysis. It would also be beneficial if the high water contents in such gases could be reduced so that the production of $SO_2$ containing waste water streams could be avoided so that water disposal downstream of the clean up stage could be reduced and made less noxious, because of a substantially reduced or eliminated content of $SO_2$. It would also be beneficial to have a process which can clean up the effluent from a Claus gas - hydrogenation/hydrolysis unit by making elemental sulfur and simultaneously generating an exhaust gas having an $H_2S/SO_2$ ratio of approximately 2 to 1, which can be supplied directly to a Claus reactor.

BRIEF SUMMARY OF THE INVENTION

A process for reducing the $H_2S$ content of a gas stream that has been subjected to catalytic hydrogenation/hydrolysis to convert substantially all the sulfur in the gas stream into hydrogen sulfide and produce a gas stream, wherein more than 90% of the sulfur compounds are present as $H_2S$ and containing more than 10 volume % $H_2O$ vapor, characterized by reducing the $H_2O$ content below 10 volumn % and contacting the resulting gas stream and oxygen at 160° to 320° C. with a catalyst containing at least 80% by weight titanium dioxide as an active ingredient to convert $H_2S$ directly into elemental sulfur.

DETAILED DESCRIPTION

Figure 1:
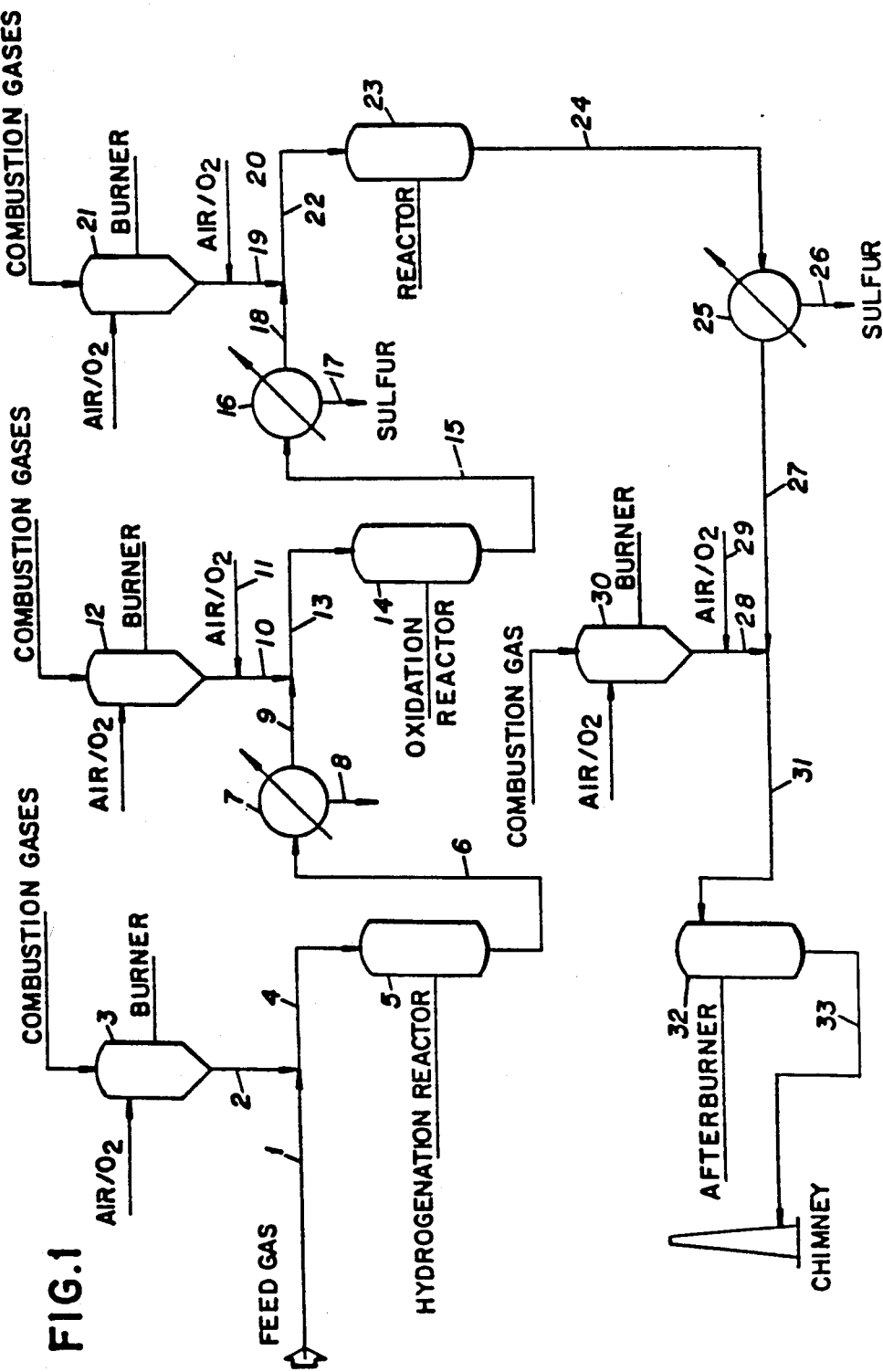
FIG. 1 is a simplified flow diagram of one embodiment of the present invention.

In the process of the invention, the oxidation of hydrogen sulfide into elemental sulfur takes place at temperatures of 160° to 320° C. entirely in the gas phase, so that no separation of sulfur on the catalyst occurs.

The process of the present invention can be used on any $H_2S$ containing gas stream. It works especially well on Claus effluent gas which has been subjected to hydrogenation/ hydrolysis to convert all the sulfur and sulfur compounds in the Claus effluent to $H_2S$.

Conversion of sulfur compounds into $H_2S$ is a known process. It is typically done with a hydrogen-containing gas at 250° to 400° C., on catalysts containing metal oxides/sulfides of the 6th and/or 8th group of the Periodic Table. Any CO present in the exhaust gas from Claus units will also be converted to $CO_2$. Thereafter, the $H_2S$ containing gas is cooled and the condensed water is removed. The conversion efficiency obtainable in the subsequent oxidation of $H_2S$ to elemental sulfur is highly dependent on the water content. The water content should be reduced to 10% by volume, preferably to 4 to 6% by volume. The gases are then mixed with an approximately stoichiometric amount of air or oxygen, based on $H_2S$, heated and introduced into the oxidation reactor. The oxidation reactor contains a titanium dioxide catalyst with high activity for the conversion of $H_2S$ into sulfur at thermodynamically favorable temperatures.

The catalyst preferably contains at least 80 wt % $TiO_2$ as the active component, and has a specific surface of 80 to 150 $m^2/g$ and a total pore volume of 0.30 to 0.45 $cm^3/g$. To increase the mechanical strength of the catalyst, alkaline earth metal sulfates can be added in an amount of 5 to 20 wt % of the finished catalyst.

$H_2S$ conversions into elemental sulfur of 70 to 95% are obtained depending on the $H_2S$ content, temperature, reaction time and oxygen content. Preferably 80 to 90% of the $H_2S$ is converted into S. Undesirable side reactions, such as the formation of COS or $SO_3$, do not occur.

The catalyst is of an entirely novel type for the production of sulfur from hydrogen sulfide. It is equally well suited for the direct oxidation of $H_2S$ into S (equation III) and for use in Claus reactors (equation II). In contrast to catalysts based $Al_2O_3$, the $TiO_2$ catalyst of the invention is not de-activated by the formation of sulfate and, in contrast to catalysts based on $SiO_2$ or aluminosilicates, is stable in steam-containing gases at high temperatures. It can also be used in the presence of excessive oxygen without requiring periodic regeneration.

Depending on the $H_2S$ content of the feed gas, and pollution controls, the oxidation reaction can be followed by additional catalytic stages. In a preferred embodiment, the gas supplied to the oxidation reactor is mixed with enough air or oxygen so that an $H_2S/O_2$ ratio of 1.5:1 and 2:1 is maintained at the catalyst bed inlet. With an inlet temperature of 200° and 270° C. and gas hourly space velocity, GHSV, of 500 to 3000, preferably 800 to 1500 $hr^{-1}$, the exhaust gas contains only unreacted $H_2S$. $SO_2$ is present in only trace amounts. This exhaust gas can be supplied to one or more downstream oxidation reactors where elemental sulfur can be formed with the same catalyst as in the first oxidation stage in a thermodynamically more favorable temperature range, e.g., 190° to 240° C. Preferably, when two oxidation reactors are used, an $H_2S/O_2$ ratio of 1:1 is used in the second oxidation reactor resulting in $H_2S/SO_2$ ratio in the exhaust gas of about 2:1 and permitting maximum conversion. The space velocities correspond to those of the first oxidation stage.

In an alternative preferred embodiment, using only one oxidation reactor supplied with air or oxygen, operation of the oxidation reactor is controlled so that the exhaust gas has an $H_2S/SO_2$ ratio of 2:1. This exhaust gas after condensation of the sulfur and reheating can then be charged to a Claus reactor operating at 170° to 200° C. Additional sulfur is formed through oxidation of $H_2S$ by $SO_2$ in contact with the titanium dioxide catalyst of the invention according to equation (II). Since the catalyst also has an excellent activity for the Claus reaction and is not de-activated by $O_2$ or sulfate, an optimum conversion can be achieved during long-term operation.

Preferably the oxidation reactor is operated to maximize conversion of $H_2S$ into elemental sulfur. After condensation of the sulfur produced, the exhaust gas is supplied to a reactor which operates at 125° to 150° C. and adsorbs on active $Al_2O_3$, any sulfur remaining in the vapor phase. With an $H_2S/SO_2$ ratio of 2:1, some sulfur is still formed after the Claus reaction. With low water contents, about 50% of the sulfur compounds are converted to elemental sulfur even with sulfatized catalysts are present in this adsorption stage. The preferred space velocities are 800 to 1500 GHSV. Because of the low sulfur content of the gas after the oxidation stage, an approximately 8-20 hour desorption phase per week is sufficient for the removal of adsorbed sulfur. For this purpose, the exhaust gas of the oxidation stage may be heated to 230° to 270° C. upstream of the adsorption reactor. After sulfur condensation at 120° to 135° C., the exhaust gas is subjected to post-combustion. The sulfur production efficiency of the Claus system and exhaust gas purification remains above 99% even during this brief desorption operation.

Figure 2:
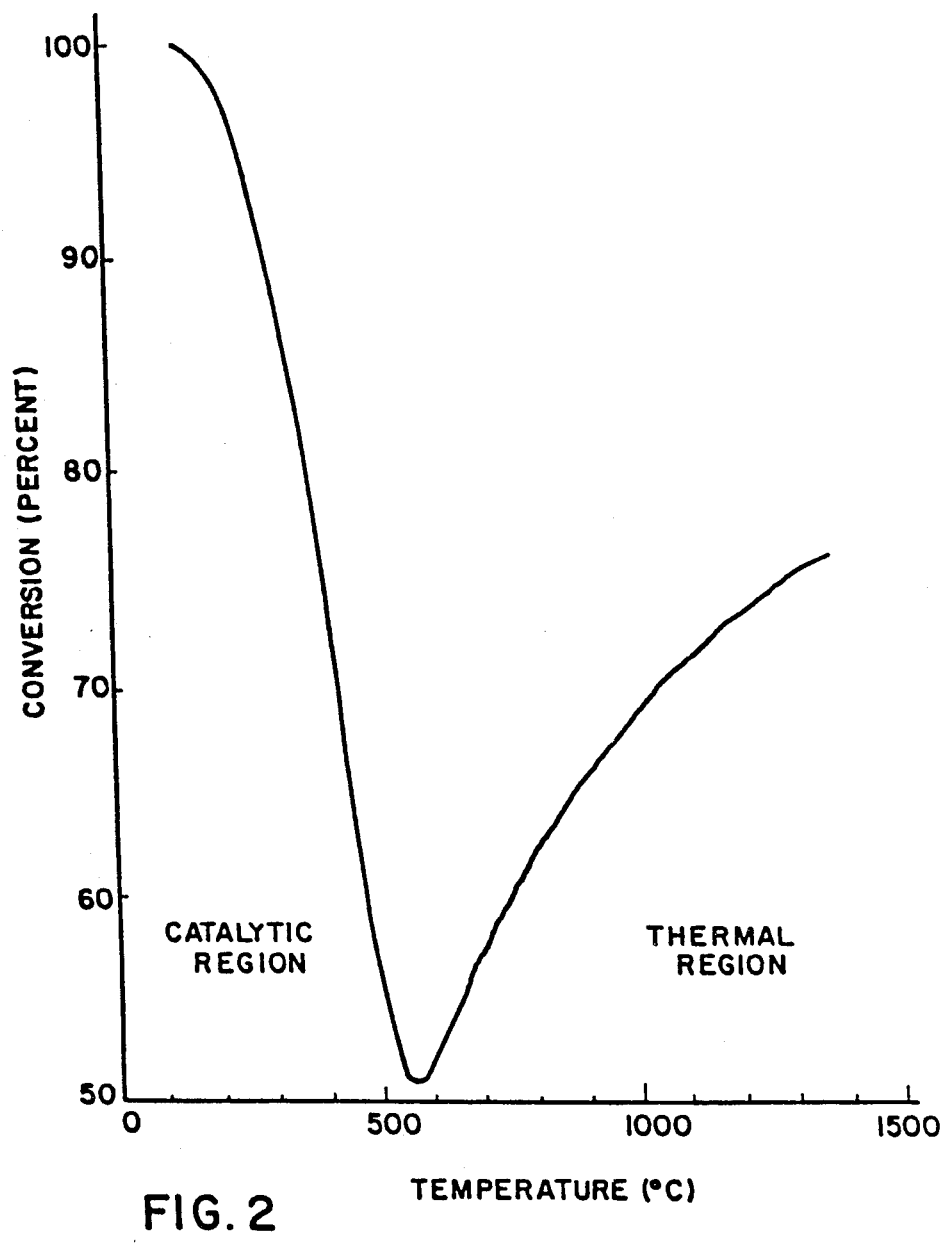
FIG. 2 shows theoretical thermodynamic conversion of $H_2S$ at varying temperatures.

FIG. 2 shows the theoretical thermodynamic conversion of $H_2S$ into S through oxidation with air under water-free conditions as a function of the temperature. It shows the importance of operating the process of the present invention at relatively low temperatures which favor the conversion of $H_2S$ into sulfur.

Referring to FIG. 1, the feed gas (the exhaust gas from the Claus process) is fed via line 1 to line 4 where it is mixed with reducing gases from line 2. This gas mixture should have a temperature of 200° to 400° C., preferably 280° to 320° C. The reducing gases, preferably $H_2$ or CO or a mixture thereof are produced by below stoichiometric combustion of suitable combustion gases in burner 3. The burner is controlled in such a way that steam and the reducing gases are available in sufficient amounts to convert all sulfur and sulfur compounds in line 1 into $H_2S$ by hydrogenation or hydrolysis and to control the temperature in the line 4.

Gas from the line 4 passes to a hydrogenation reactor 5 which contains a pre-sulfided cobalt and molybdenum catalyst. In this reactor, the sulfur compounds in the feed are almost completely converted into $H_2S$. Reactor effluent flows via line 6 to condenser 7 which cools the effluent, preferably to 10° to 50° C. The acid water which condenses is discharged via line 8. Cooling of reactor effluent can also be effected by direct cooling, using a waste heat boiler, and indirect cooling. The acid water in line 8 contains an equilibrium amount of $H_2S$, but very little $SO_2$ because all the sulfur compounds in the feed gas, including the $SO_2$, were converted into $H_2S$.

Before entering oxidation reactor 14, the cooled gas from the condenser 7 is mixed in a line 13 with oxygen and/or air from lines 11 and 10. Oxygen may also be used and will not dilute the gas streams being treated with nitrogen, so the extra cost of pure $O_2$ or oxygen enriched air may be justified in some applications. Air is preferred because it is free, and hereafter only air will be mentioned. Enough air to give the preferred $H_2S/O_2$ ratio of 1.5-2:1 is added. The gases enter the reactor 14 at 160° to 320° C., preferably 180° to 300° C., because of burner 12, which burns combustion gas and air at a fixed ratio. The heating of the gases can, of course, be effected in many other ways.

In the reactor 14, the reactant gases contact the titanium dioxide catalyst preferably at 800 to 1500 GHSV and temperatures 200° to 270° C. In this temperature range, direct conversion of $H_2S$ into sulfur and steam at 80 to 95% efficiency is possible.

From the reactor 14, the reacted gases flow via line 15 to condenser 16 preferably operating at 120° to 140° C. The sulfur vapor condenses and liquid sulfur is removed from condenser 16 via line 17.

After passage through the condenser 16, the gas mixture flows via lines 18 and 22 to a second oxidation reactor 23. The gas mixture is heated with hot gas from burner 21, or other device, so that temperatures of 190° to 240° C. prevail in line 22. Air from line 20 and line 19 is added, if needed, to adjust the $H_2S/O_2$ ratio of the gas in line 22, preferably to a value of 1:1 to optimize a second direct oxidation.

This second direct oxidation preferably uses the titanium dioxide catalyst of the invention in reactor 23 at 800 to 1500 GHSV. The resulting oxidized gas, containing elemental sulfur vapor is removed via line 24 to a second condenser 25 which preferably cools the gas to 120° to 140° C. The liquid sulfur condenses and is removed via line 26.

Gas is removed from the condenser 25 via line 27 and heated with hot gas from burner 30 to a temperature sufficient to allow complete oxidation of the remaining sulfur components in the after-burner 32. An excess of air is usually added via lines 28, 29. The exhaust gases from the reactor 32 are discharged to the atmosphere via line 33 and the chimney. The reheating of gas in line 27 and afterburning to $SO_2$ in afterburner 32 are conventional and form no part of the present invention. Other conventional after treatment, of the gas in line 27 may also be performed.

In a variation of the process, and with identical conditions prevailing in line 13, the amount of oxygen or air from line 11 is adjusted so that an $H_2S/SO_2$ ratio of 2:1 is achieved downstream of the oxidation reactor 14 in line 15. The elemental sulfur generated is again condensed in condenser 16 and recovered via line 17. Therafter, the gas mixture is reheated, e.g., with burner 21 but with no more air addition, and fed via line 22 to reactor 23 which preferably operates at 180° to 200° C., 800 to 1500 GHSV with out titanium dioxide catalyst. More sulfur is produced in this reactor by the Claus reaction. Sulfur is removed in the condenser 25, as before.

In another variation enough air is introduced via line 11 so that with the other conditions remaining the same, the $H_2S/O_2$ ratio in the line 13 allows a maximum conversion of $H_2S$ into an elemental sulfur in the reactor 14. Condenser 16 operates in a preferred temperature range of 130° to 150° C. and liquid sulfur is recovered via line 17. Reactor 23 operates in a preferred temperature range of 125° to 150° C. and contains an active aluminum oxide catalyst by which adsorption of sulfur takes place according to a Claus reaction. After clogging with sulfur, the reactor 23 is heated to drain off sulfur with the help of the stoichiometrically operated burner 21 which heats the gas in line 22 to a preferred range of 230° to 270° C. Sulfur condenser 25 is operates under the same conditions. Feed gas may also be supplied to line 6 or line 9, if it contains $H_2S$ as the only S-carrying component, or is water-free.

The invention will now be more particularly described with reference to the following Examples.

EXAMPLE 1

A feed gas having the following composition is processed in a 2 stage Claus unit:

| | |
|---|---|
| $H_2S$ | 76% by volume |
| $CO_2$ | 21% by volume |
| $CH_4$ | 2.5% by volume |
| $N_2$ | 0.5% by volume |

A sulfur yield of approximately 95% is achieved.

Column 1 of Table I shows the composition of the Claus exhaust gas leaving a sulfur condenser/separator operated at 125° C.

After hydrogenation/hydrolysis at 290°–320° C. and GHSV of 1100 to 1200 $h^{-1}$, the $H_2S$ and $H_2O$ rich gas mixture shown in column 2 of Table I is produced.

The water is removed from this gas by cooling it to 35° C. (column 3). Then the gas is reheated to 200° C. before it enters the oxidation reactor 14.

The gas volume is reduced by about 25% by removing $H_2O$. The subsequent piping and reactors may be smaller than other processes which do not remove water after hydrogenation/hydrolysis. Considerably less energy is required for reheating because there is less water in the gas. After hydrogenation, practically the only sulfur compound present in the gas is $H_2S$, so processing of the condensed water does not pose any problems in a conventional acid water stripper. The treated water can therefore be used as cooling water or even as boiler feed water.

Roughly stoichiometric air, relative to $H_2S$, is added to the hydrogenated gas upstream of oxidation reactor 14. In the present example, about 0.6 to 1 $m^3 O_2$ is added to each $m^3 H_2S$.

With an inlet temperature of 200° C., the $H_2S$ gas contacts the titanium dioxide catalyst at a GHSV of 1100. The reactor temperature rises to about 280° C. because the reaction is exothermic. About 85% of the $H_2S$ is converted into sulfur. After sulfur condensation at 130° C., the exhaust gas has a composition according to column 4 of Table I. Relative to the $H_2S$ entering the Claus unit, the sulfur yield is 99.1%.

Sulfur yields can be increased further by increasing the efficiency of the Claus unit, reducing the water content after hydrogenation/hydrolysis, a lower space velocity in reactor 14, and/or by the removal of heat from the catalyst bed in reactor 14.

Adding a further Claus reactor operating at the temperature of the gas flow leaving the sulfur condenser 16, i.e., at 135° C. and GHSV of 1100 increases the sulfur yield. Conventional active aluminum oxide catalyst can be used in reactor 23. Reactor 23 can operate about 1 week before desorption of sulfur is necessary. Desorption takes approximately 12 hours, with the exhaust gas leaving the condenser 16 heated to about 240° C. by hot gas from burner 21. Column 5 shows the composition of the exhaust gas after the adsorption phase. The overall sulfur production efficiency is 99.5% relative to the $H_2S$ entering the Claus unit.

The exhaust gas is then preferably subjected to conventional after combustion. Since besides $H_2S$ and traces of elemental sulfur, practically no other sulfur compounds (COS, $CS_2$) must be oxidized, catalytic post-combustion can be effected in afterburner 32 at a low temperature (290° to 300° C.). This involves considerably lower energy consumption as compared with thermal post-combustion. Either thermal or catalytic post-combustion may be used.

TABLE I

| Drawing Line # | | (1) 1 | (2) 6 | (3) 9 | (4) 18 | (5) 27 |
|---|---|---|---|---|---|---|
| $H_2S$ | %/volume | 0.70 | 1.18 | 1.56 | 0.15 | 0.083 |
| $SO_2$ | %/volume | 0.35 | 0 | 0 | 0.073 | 0.043 |
| $S_{6-8}$ | $g/m^3(vn)$ | appr. 1 | 0 | 0 | appr. 0.7 | max. 0 |
| COS | %/volume | 0.09 | 0.002 | 0.003 | 0.003 | 0.003 |
| $CS_2$ | %/volume | 0.09 | 0.002 | 0.003 | 0.003 | 0.003 |
| $N_2$ + Ar | %/volume | 59.5 | 61.1 | 80.7 | 80.8 | 80.9 |
| $CO_2$ | %/volume | 8.4 | 9.0 | 11.9 | 11.5 | 11.5 |
| CO | %/volume | 0.43 | 0.05 | 0.065 | 0.06 | 0.06 |
| $H_2$ | %/volume | 1.4 | 1.07 | 1.41 | 1.33 | 1.33 |
| $H_2O$ | %/volume | 29.0 | 27.6 | 4.4 | 6.1 | 6.15 |
| Sulfur yield % | | 95 | 95 | 95 | 99.1 | 99.5 |

Where:
(1) = Claus effluent
(2) = Claus effluent after hydrogenation/hydrolysis
(3) = (2) after cooling to 35° C. to remove $H_2O$
(4) = Post direct oxidation and sulfur condensation
(5) = Post alumina adsorption In this Example the second oxidation reactor 23 contained active alumina, so it is not an oxidation reactor, but functions more as a Claus reactor.

EXAMPLE 2

When the exhaust gas to be treated has a high $H_2S$ content, two successively arranged oxidation stages, with the titanium dioxide catalyst of the invention in each stage, are preferred. This is because the selective oxidation of hydrogen sulfide into elemental sulfur is highly exothermic. Such an arrangement is shown in FIG. 1. Both reactors 14 and 23 contain titanium dioxide catalyst.

Table II shows typical data in connection with such a case.

With a feed gas containing, for example, 2.5% by volume $H_2S$ and 5–6% by volume $H_2O$ (column 1, Table II), and with approximately stoichiometric air added to the first oxidation stage, an effluent gas is obtained containing the sulfur and unconverted $H_2S$ as practically the only remaining sulfur compound. Conversion of at least 75% of the $H_2S$ is attainable in continuous operation with a GHSV of about 1250 and temperatures between 200° and 300° C. Lower space velocities and/or lower water contents will improve $H_2S$ conversion.

After sulfur condensation at about 130° C. and reheating, the gas (column 2) is charged to a second oxidation reactor 23. Enough $O_2$ is added so that an $H_2S/SO_2$ ratio of approximately 2:1 is obtained at the outlet of the reactor 23. The reactor temperature is between 200° and 230° C. and the GHSV is 1250 hr$^{-1}$. Once more 70% of the $H_2S$ which had not been converted during the first oxidation stage is oxidized to sulfur (column 3), the greater part of which is separated in the subsequently arranged condenser 25 operating at 125° C.

Relative to the case of the Claus system to which Example 1 refers, the result is a total sulfur production of 99.3%.

TABLE II

| STREAM | | (1) | (2) | (3) |
|---|---|---|---|---|
| $H_2S$ content | %/volume | 2.5 | 0.65 | 0.10 |
| $SO_2$ content | %/volume | 0 | trace | 0.05 |
| Oxidation reactor | | | | |
| $O_2$ added | m$^3$/m$^3$H$_2$S | 0.5 | 1 | |
| Reactor | | | | |
| IN | °C. | 200 | 200 | |
| OUT | °C. | 320 | 240 | |
| Conversion rate of $H_2S$ into S in each reactor | % | 75 | 70 | |

EXAMPLE 3

To increase sulfur yield, the oxidation reaction can also be operated to produce an exhaust gas with a low content of $H_2S$ and $SO_2$ in a molar ratio of about 2:1 which, after sulfur condensation at 125° C. and reheating to 180° C., can be sent to a Claus reactor.

The titanium dioxide catalyst used in the oxidation reactor(s) may also be used in the Claus reactor. The new titanium dioxide catalyst permits attaining a high Claus yield without de-activating the catalyst at thermodynamically favorable temperatures in the presence of free oxygen. This would not be possible with a conventional Claus catalyst based on $Al_2O_3$. Typical data which are attainable in practical continuous operation are given in Table III.

About 80% conversion of $H_2S$ into elemental sulfur is achieved in the first oxidation stage with a feed gas with 2% by volume $H_2S$ and 5-6% by volume $H_2O$ (column 1) when applying a slightly higher than stoichiometric amount of $O_2$(0.65 m$^3$ $O_2$ per m$^3$ $H_2S$) at a GHSV of about 1250 h$^{-1}$ and a temperature of 200° to 310° C.

The oxidation stage effluent contains low amounts of $H_2O$ and $SO_2$ at a ratio of approximately 2:1 (column 2). After sulfur condensation at 125° C. and reheating to 180° C., this gas is charged to a Claus reactor. In this way, it is possible to convert another 75% of the not yet converted sulfur compounds into elemental sulfur (column 3) in a continuous operation using a TiO$_2$ catalyst. This elemental sulfur is, for the greater part, separated in a subsequent sulfur condenser at 125° C. The space velocity in the Claus reactor is also at 1250 h$^{-1}$.

Relative to the case of the Claus system to which Example 1 refers, the result is a total sulfur production of 99.5%.

TABLE III

| | | (1) | (2) | (3) |
|---|---|---|---|---|
| $H_2S$ | %/volume | 2.0 | 0.28 | 0.07 |
| $SO_2$ content | %/volume | 0 | 0.14 | 0.035 |
| Oxidation reactor | | | | |
| $O_2$ added | m$^3$/m$^3$H$_2$S | 0.65-1 | | |
| Reactor | | | | |
| IN | °C. | 200 | 180 | |
| OUT | °C. | 310 | 190 | |
| $H_2S$ Conversion rate in each reactor | % | 75 | 70 | |

The process of the invention makes it possible to convert substantially all the sulfur compounds contained in the feed gas into elemental sulfur. It is economical in operation and energy consumption and allows sulfur yields of 99.5% to be obtained in long-term operation despite varying operation of the Claus unit. Our process requires less capital investment and utilities as compared with known processes yet produces equally high sulfur yields. It can also produce sulfur from gas streams having $H_2S$ contents too low for processing by the Claus process. Gas streams consisting mainly of light, saturated hydrocarbons, hydrogen or carbon monoxide can also be treated by our process, as these compounds are not oxidized under the conditions for selective oxidation of $H_2S$ into elemental sulfur. Our process does not require any exotic or commercially unproven equipment.

We claim:

1. A process for the reduction of sulfur content in a gaseous stream with the production of elemental sulfur, comprising the steps of:
   (a) treating the gaseous stream by at least one of hydrogenation and hydrolysis to convert substantially all of the sulfur components therein to hydrogen sulfide,
   (b) then reducing the water content of the gaseous stream to less than 10 volume percent;
   (c) introducing oxygen into the gaseous stream;
   (d) treating the gaseous stream in an oxidation reactor, containing a catalyst comprising at least 80 percent by weight titanium dioxide, at a temperature of about 160° C. to 320° C. wherein substantial conversion of $H_2S$ to elemental sulfur occurs; and
   (e) cooling the product gas after it leaves the oxidation reactor to separate elemental sulfur by condensation.

2. The process of claim 1 carried out at a gas hourly space velocity of 500 to 3000.

3. The process of claim 9 wherein the catalyst has a specific surface area of 80 to 150 M$^2$/g and a pore volume of 0.30 to 0.45 cm$^3$/g.

4. The process of claim 1 wherein the catalyst contains 5 to 20% by weight of an alkaline earth metal sulfate.

5. The process of claim 1 wherein after condensation and separation of the elemental sulfur produced, the off-gas is fed to a Claus reactor.

6. The process of claim 1 wherein the Claus reactor uses an alumina catalyst.

7. The process of claim 1 wherein the Claus reactor uses a titanium dioxide catalyst.

8. The process of claim 1 wherein the $H_2S/O_2$ ratio in the gaseous stream introduced into the oxidation reactor is controlled such that the unconverted sulfurs in the product gas consist essentially of $H_2S$.

9. The process of claim 1 wherein the $H_2S/O_2$ ratio in the gaseous stream introduced into the oxidation reactor is controlled such that the unconverted sulfurs in the product gas consist essentially of $H_2S$ and $SO_2$ in the ratio of 2 to 1, respectively.

10. The process of claim 1, wherein the water in the gaseous stream is reduced to about 4 to 6 volume percent in step (b).

11. The process of claim 1 wherein the space velocity is about 800 to 1500 $hr^{-1}$.

12. The process of claim 1 wherein additional components in the gaseous stream, such as light saturated hydrocarbons, hydrogen, or carbon monoxide, are not oxidized.

13. The process of claim 1 wherein the feed gaseous stream contains as sulfur compounds $H_2S$, $SO_2$, COS, $CS_2$, $CH_3SH$, sulfur vapor or any combination thereof.

* * * * *

UNITED STATES PATENT AND TRADEMARK OFFICE
CERTIFICATE OF CORRECTION

PATENT NO. : 4,857,297

DATED : August 15, 1989

INVENTOR(S) : Roland Kettner, Norbert Liermann and Torsten Lubcke

It is certified that error appears in the above-identified patent and that said Letters Patent is hereby corrected as shown below:

Col. 5, Line 27    delete "$O_2$or"
                   insert -- $O_2$ or --

Col. 10, Line 52   delete "9"
                   insert -- "1"

Signed and Sealed this

Third Day of July, 1990

*Attest:*

HARRY F. MANBECK, JR.

*Attesting Officer*    *Commissioner of Patents and Trademarks*